United States Patent [19]
Zeleney

[11] 4,062,224
[45] Dec. 13, 1977

[54] BRAKE TESTER

[75] Inventor: Leo Z. Zeleney, Warren, Mich.

[73] Assignee: Nucleus Corporation, Madison Heights, Mich.

[21] Appl. No.: 700,097

[22] Filed: June 28, 1976

[51] Int. Cl.² .............................................. G01L 5/28
[52] U.S. Cl. ......................................... 73/39; 73/121
[58] Field of Search .................... 73/121, 129, 128, 39

[56] References Cited

U.S. PATENT DOCUMENTS

| | | | |
|---|---|---|---|
| 2,509,816 | 5/1950 | Elson | 73/39 |
| 3,088,311 | 5/1963 | Dobrikin et al. | 73/39 |
| 3,772,914 | 11/1973 | Phol et al. | 73/121 |
| 3,870,869 | 3/1975 | Eberle et al. | 235/92 CP |

*Primary Examiner*—James J. Gill
*Assistant Examiner*—Anthony V. Ciarlante
*Attorney, Agent, or Firm*—Gifford, Chandler, Sheridan & Sprinkle

[57] ABSTRACT

Apparatus for the determination of the brake actuation and release time for pneumatic brake systems. The brake tester is pneumatically connected to both an external source of pressure and the vehicle reservoir with a solenoid valve disposed between the external source and the vehicle reservoir so that an operator may incrementally increase the pressure within the reservoir. The brake tester includes a timing circuit which begins to run upon movement of the vehicle brake pedal and stops upon the attainment of predetermined pressure value within the vehicle brake chambers. The timing circuit also includes memory means to store the results of the brake actuation test so that both a brake actuation and release test may be sequentially conducted without interruption.

9 Claims, 4 Drawing Figures

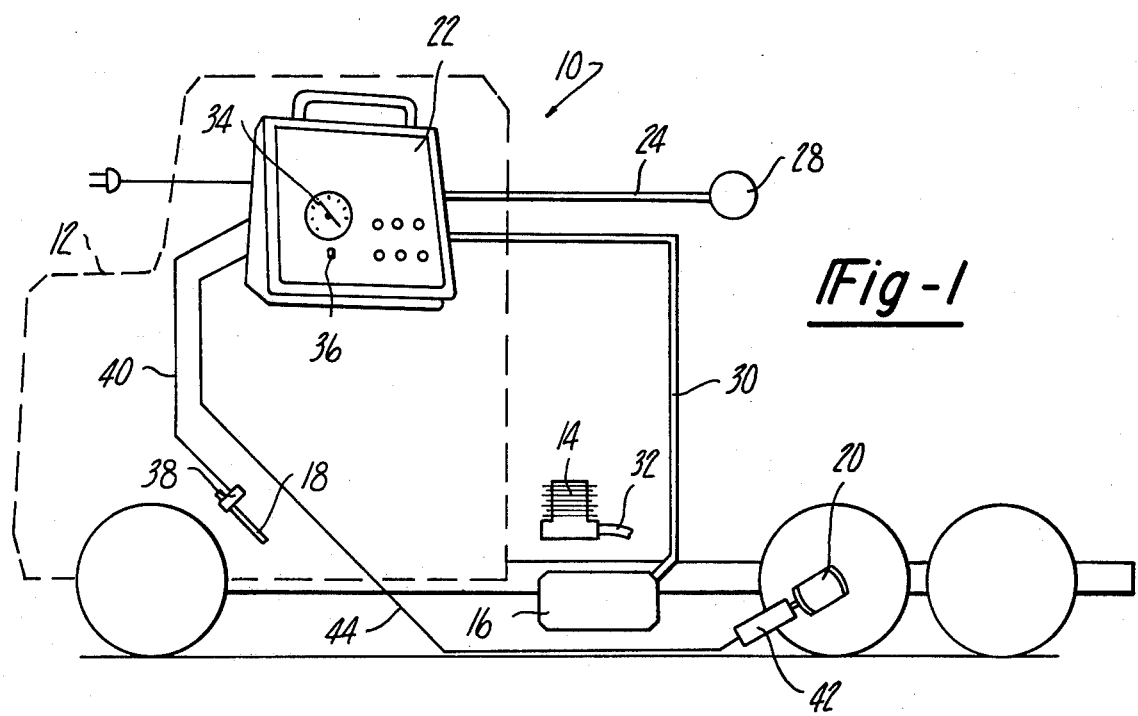
*Fig-1*
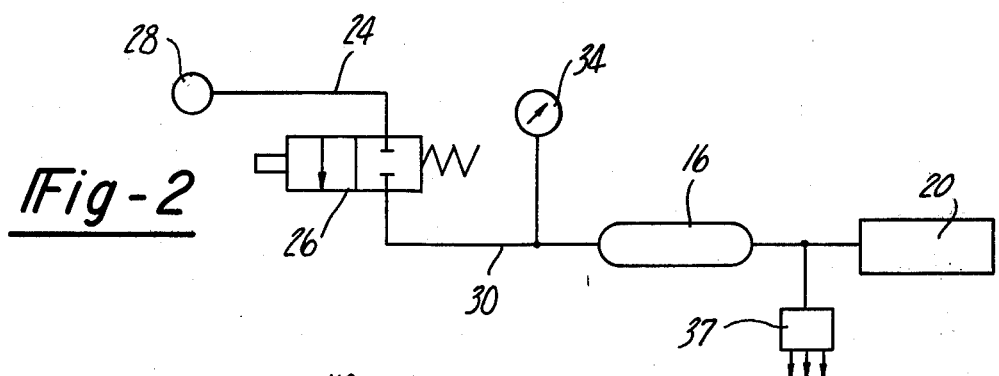
*Fig-2*
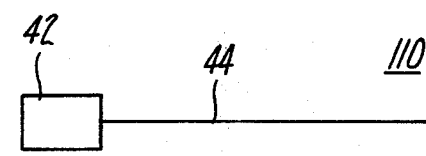
*Fig-4*
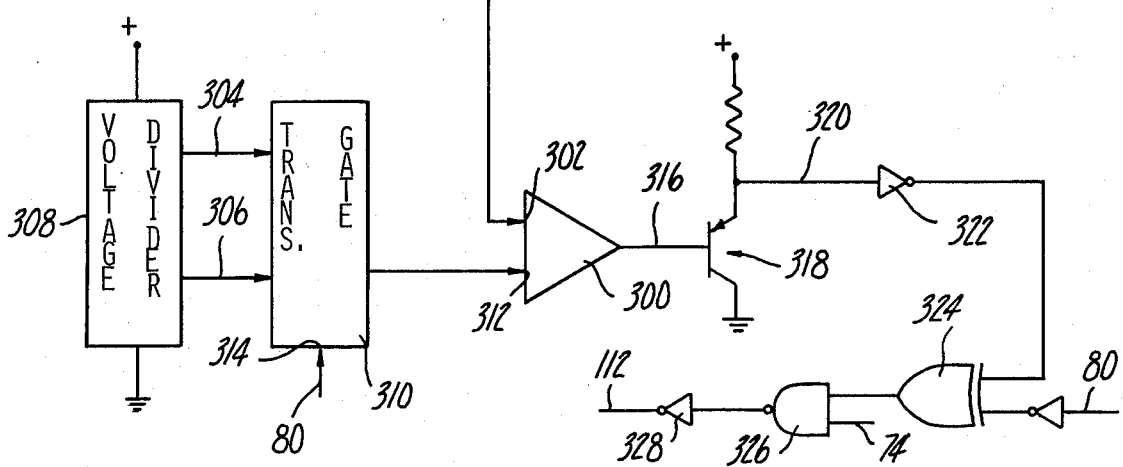

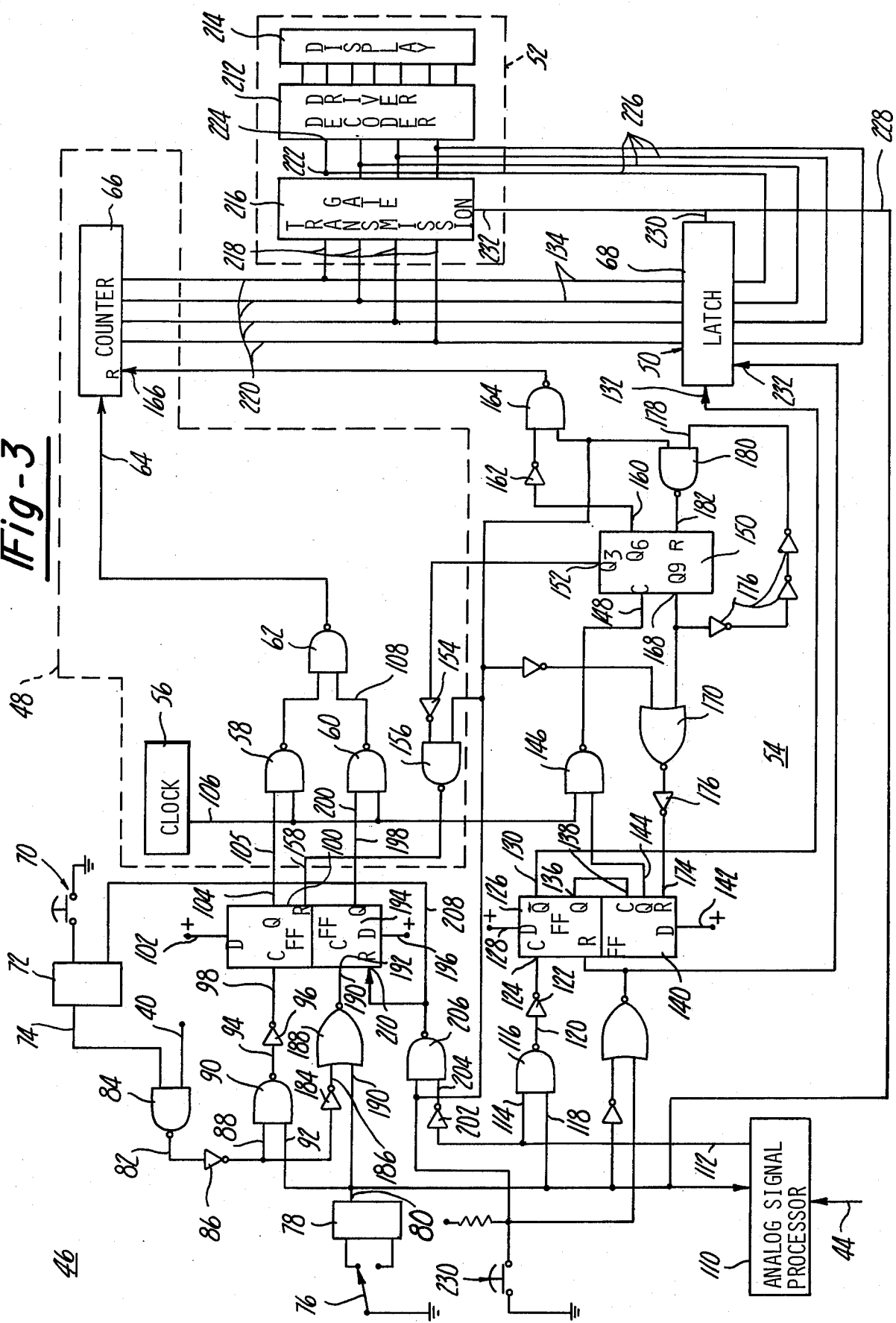

BRAKE TESTER

BACKGROUND OF THE INVENTION

1. Field of the Invention

The present invention relates generally to brake testers and more specifically to a tester for pneumatic brakes for measuring the elapsed time between the actuation of the brake pedal and the attainment of a predetermined pressure with the brake chamber.

2. Description of the Prior Art

On May 17, 1974, the Federal Government issued certain regulations, which regulations may be found in 39. F. R. 17550, assigning minimum required standards for pneumatic brake systems. More specifically, the above named Federal Regulations specify two tests for pneumatic brake systems. The first test, denoted the brake actuation "With an initial service reservoir system air pressure of psi, the air pressure in each brake shall in the case of trucks and buses, reach 60 psi in not more than 0.35 seconds measured from the first movement of the service brake control and, in the case of trailers reach 60 psi in not more than 0.25 seconds measured from the first moment the service brake control". The second test, denoted the brake release time test provides in part:

"With an initial brake chamber air pressure of 95 psi, the air pressure in each brake chamber shall, in the case of trucks and buses, fall to 5 psi in not more than 0.50 seconds measured from the first movement of the service brake control and, in the case of trailers, fall to 5 psi in not more than 0.60 seconds measured from the first movement of the brake control".

Following the promulgation of the above regulations, which became effective on Jan. 1, 1975, and Mar. 1, 1975 respectively, several brake testers were developed to measure the brake actuation and release time as required by the regulations. These previously known brake testers typically comprise a test unit situated externally of the vehicle. A pressure transducer attached to the brake chamber provides the required pressure input signals to the brake tester while a second line connected to the brake pedal provides a signal upon the movement of the brake pedal. These previously known brake testers essentially comprise only the timing circuit which begins to run upon actuation of the brake pedal and which is stopped by the attainment of a predetermined pressure condition within the brake chamber.

These previously known brake testers suffer from many advantages unknown to the present invention. First, two operators are required to run the test operation, namely, one person in the vehicle to actuate the brake pedal and the other person at the brake tester to record the results of the test. Needless to say, the requirement of two persons for each testing operation greatly increases the labor costs of the brake testing operation and is therefore undesirable.

Second, the previously known brake testers are typically designed with preset pressure controls so that only a single test, i.e. the brake application test or the brake release test, may be performed at any given time. Thus it has become the practice of the previously known brake testers to conduct the brake actuation test on the multiple brake chambers and thereafter reset the pressure controls and conduct the brake release test. This procedure, required by the previously known brake testers, necessitates the running of essentially two independent tests on each brake cylinder and therefore increases the time required for a complete test of the brake cylinder.

Still another problem in the previously known brake testers is such that such testers utilize the vehicle air compressor to pressurized the air reservoir. It is very difficult however to obtain the precise pressure of 95 psi, needed for the initiation of the brake release test, or 100 psi, needed for the initiaton of the brake application test, within the vehicle reservoir by using the vehicle air compressor. It has been found that much time is wasted by the test operators in adjusting the air pressure in the vehicle air reservoir due to 95 psi or 100 psi as required by the Federal Regulation and again this is undesirable.

SUMMARY OF THE PRESENT INVENTION

The brake tester of the present invention overcomes the above mentioned disadvantages of the previously known brake testers by providing a brake tester which may be situated in the cab of the test vehicle during the brake test. Since the brake tester is located in the cab of the vehicle being tested, only a single test operator is required to both actuate the vehicle brake and record the test results.

A source of external pressure, such as a shop line, is connected to the brake tester of the present invention. The pneumatic connection between the vehicle air compressor and the vehicle air reservoir is disconnected and a pneumatic line from the brake tester is connected to the air reservoir thereinstead. Solenoid valve means are disposed between the source of external pressure and the pneumatic line running to the vehicle air reservoir so that the air pressure within the reservoir may be incrementally increased from the external source of air pressure.

A pressure transducer secured to the brake chamber produces an analog electrical signal to the brake tester in response to the pressure within the chamber. Similarly an accelerometer secured to the brake pedal provides an electrical signal to the brake tester upon movement of the brake pedal.

During a brake actuation test, upon movement of the brake pedal, the signal from the accelerometer initiates an electronic clock with the brake tester. When the pressure within the brake chamber reaches 60 psi, an analog signal processor within the brake tester causes the time on the electronic clock to be stored within a latch and the clock is then reset to zero. The operator then incrementally increases the pressure in the air reservoir by the electric solenoid valve until the pressure within the reservoir is 95 psi. When the brake pedal is released the accelerometer again starts the electronic clock and when the pressure within the brake chamber drops to 5 psi, the analog signal processor generates another signal which stops the electronic clock. At this time the test is completed and actuation of a switch will display the brake actuation time, which is stored in the latch, or the brake release time, which is stored in the electric clock.

It can thus be seen that the brake tester of the present invention achieves many advantages unknown to the previously known brake testers. The brake tester of the present invention requires only a single test operator rather than the two operators previously required, thereby greatly reducing labor costs. Moreover unlike the previously known brake testers, the brake tester of the present invention sequentially tests the brake actuation test and brake release test before the recordation of data and without intervening distraction. In addition by utilizing a source of external pressure rather than the vehicle air compressor to pressure the vehicle air reservoir, it has been found that the air reservoir may be more rapidly, accurately and easily pressurized to 95 psi or 100 psi as required, than by utilizing the vehicle air compressor.

BRIEF DESCRIPTION OF THE DRAWINGS

Other advantages of the present invention will become apparent to those skilled in the art by reference to the following detailed description when read in conjunction with the attached drawing, wherein like reference characters refer to like parts throughout the several views and in which:

FIG. 1 is a diagrammatic representation of the brake tester of the present invention;

FIG. 2 is a schematic view of the pneumatic control circuit of the brake tester of the present invention;

FIG. 3 is a schematic view showing the electronic timing circuitry of the present invention; and FIG. 4 is a schematic view of an exemplary analog signal processor for use with the brake tester of the present invention and with parts removed for clarity.

DETAILED DESCRIPTION OF THE PRESENT INVENTION

Referring particularly to FIGS. 1 and 2, the brake tester of the present invention, generally indicated by the numeral 10, is shown in FIG. 1 as situated in the cab of a vehicle 12. The vehicle 12, typically a truck or a bus, is equipped with a conventional pneumatic brake system. Such brake systems typically include a vehicle air compressor 14 and a vehicle air reservoir 16. In the conventional fashion a brake pedal 18, upon depression by the operator, communicates pressurized air from the reservoir 16 to the vehicle brake chambers 20 thereby actuating the vehicle brakes. For clarity, the pneumatic connections between the brake pedal 18, reservoir 16 and brake chamber 20 are omitted from FIG. 1 since these connections are not only conventional but also form no part of the present invention.

As will become shortly apparent, the major components of the brake tester 10 are contained within a housing 22 which, as previously noted, is preferably positioned within the cab of the vehicle 12. A first conduit 24 is connected at one end to a valve 26 (FIG. 2) contained within the housing 22 and at its other end fluidly communicates with a source 28 of pressurized air. The source 28 of pressurized air may conveniently be a shop air compressor and preferably produces a pressure in excess of 100 psi.

A second conduit 30 fluidly connects the valve 26 to the reservoir 16. Although the conduit 30 may be connected to the reservoir 16 in any conventional manner it has been found most convenient to disconnect the conduit 32 normally between the vehicle air compressor 14 and the reservoir 16 and to connect the second conduit 30 to the reservoir 16 thereinstead. A pressure gage 34 is also mounted in a housing 22 and fluidly communicates with the second conduit 30 so that the air pressure in the conduit 30, and hence the reservoir 16, is displayed on the pressure gage 34.

The valve 26 may be of any conventional design but preferably comprises an electric solenoid valve. The valve 26 is operable by control 36 on the brake tester housing 22 to incrementally permit fluid communication between the first conduit 24 and the second conduit 30. Thus it should be apparent that by actuating control 36 the air pressure in the reservoir 16 may be incrementally increased from the external source 28 of pressure. If the air pressure within the reservoir 16 is increased by the valve 26 in excess of the desired pressure, a treadle valve 37, a conventional component of the vehicle brake system, may be opened to exhaust the excess pressure within the reservoir 16.

The brake tester 10 must be provided with a signal upon the movement of brake pedal 18. Accordingly, an accelerometer 38 is mechanically attached to the brake pedal and provides an electric pulse along line 40 to the brake tester 10 upon movement of the brake pedal 18. Likewise the brake tester 10 must be provided with a signal indicative of the pressure in the brake chamber 20. Thus a conventional pressure transducer 42 is connected to the brake chamber 20 in any conventional manner. The transducer 42 provides an electric analog signal which is proportional to the pressure in the chamber 20 along line 44 to the brake tester 10.

The pneumatic operation of the present invention can only be generally described prior to the description of the electronic circuitry within the housing 22. However, realizing this limitation, prior to the brake application test, the operator opens valve 26 by depressing control 36 thus permitting fluid communication between the first conduit 24 and the second conduit 30 until the pressure within the reservoir 16 reaches 100 psi which is required by law at the initiation of the brake application test. In a manner to be hereinafter understood, the brake application test is conducted by depressing the brake pedal 18. At the completion of the brake application test, with the brake pedal 18 still depressed, the operator manipulates the control 36 in order to adjust the pressure in the reservoir 16, and hence the brake chamber 20, to 95 psi as required for the initiation of the brake release test. If additional air pressure is required, control 36 is actuated thus opening valve 26 and permitting fluid communication from the first conduit 24 to the second conduit 30 and into the reservoir 16. Conversely, if the reservoir pressure is in excess of 95 psi, the operator actuates the vehicle treadle valve 36 to exhaust gas from the reservoir 16. When the correct pressure of 95 psi is obtained in the reservoir 16, the brake pedal 18 is released and the brake release test is conducted.

The electronic circuitry of the brake tester 10 of the present invention is most clearly understood by reference to FIG. 3. It will be understood, however, that other circuitry may be used without deviating from either the spirit or scope of the present invention. Also it is to be understood that while the present circuit is capable of time measurement in 1/1000 of a second increments, the circuit is equally adaptable to any desired time divisions or accuracy.

The circuit means 46 essentially comprises timing means 48, memory means 50, display means 52 and control means 54. The timing means 48 further comprises a 1000 Hz. free running clock 56 which is selectively gated by the control means 54 through NAND gates 58, 60 and 62 to the input 64 of a counter 66. The memory means 50 comprises a latch 68 the operation of which will later be more fully described, while the display means 52 selectively displays the count in the counter 66 or the latch 68. The control circuit 54 generally selectively gates the clock 56 output to the counter input 64 in response to signals from the brake accelerometer 38 and the pressure transducer 42 in a manner which will now be described in detail.

At the initiation of the brake application test, a push button 70 on the brake tester housing 22 is depressed thus setting an R-S flip-flop 72 and setting the output line 74 of the flip-flop 72 to a high condition. Simultaneously an SPDT switch 76, which likewise is located on the brake tester housing 22, is set to the "Apply" position thus setting an R-S flip-flop 78 and setting the output 80 of the flip-flop 78 to a high condition. The other output 81 (not shown) of the flip-flop 78 is, of course, the opposite logical state from the output 80. The circuit means 46 is now ready for the brake application test.

When the brake pedal 18 is depressed the accelerometer 38 produces a positive voltage pulse on line 40 which consequently drives the output 82 of a NAND gate 84 to a low condition. An inverter 86 subsequently produces a positive voltage pulse on input 88 of NAND gate 90. Since the second input 92 of NAND gate 90 is already in a high condition from the output 80 of the flip-flop 78, a negative voltage pulse is produced at the output 94 of NAND gate 90 which is inverted into a positive voltage pulse by inverter 96. The output of the inverter 96 is connected to the clock input 98 of a clocked D flip-flop 100. The DATA input 102 of the flip-flop 100 is hard wired at a high condition so that a positive voltage pulse at the clock input 98 drives the Q output 104 of the flip-flop 100 to a high condition. The Q output 104 in turn is connected to the input 105 of NAND gate 58 so that the output 106 of the free running clock 56 is gated through NAND gates 58 and 62 to the input 64 of the counter 66. The second input 108 of NAND gate 62 is in a high condition as will become later hereinafter apparent so as to permit the proper gating of the clock output 106 through NAND gates 68 and 62. As thus far described it can be seen that upon actuation of the brake pedal 18 the clock output 106 is gated into the input 64 of the counter 66 so that the count in the counter represents the elapsed time in milliseconds from the depression of the brake pedal 18.

The line 44 from the pressure transducer is connected to the input of an analog signal processor 110. The processor 110 is of conventional design and functions to produce a positive voltage pulse on its output line 112 when the voltage signal from the pressure transducer 42 corresponds to a pressure of 60 psi in the brake chamber. It will be remembered that according to the Federal Regulations previously cited, a pressure 60 psi in the brake chamber represents the end of the brake application test. An exemplary signal processor 110 will be later discussed in greater detail.

The positive voltage pulse on line 112 is coupled to the input 114 of a NAND gate 116. The second input 118 of NAND gate 116 is already in a high condition from the output 80 of the flip-flop 78. Accordingly, a negative voltage pulse is produced at the output 120 of NAND gate 116 which is inverted by inverter 122 to produce a positive voltage pulse at the clock input 124 of a clocked D flip-flop 126. The DATA input 128 of the flip-flop 126 is wired at a high condition thus producing a low condition at the $\overline{Q}$ output 130 of the flip-flop 126.

The $\overline{Q}$ output 130 of the flip-flop 126 is connected to the STROBE input 132 of a tri-state latch 68, such as Motorola Part No. MC-14508. The latch inputs 134 are connected to the outputs of the counter 66 so that when a low condition appears at the STROBE 132, the count in counter 66 is stored in the latch 68 and the brake application test is completed.

In order to prepare the circuit means 46 for the brake release test, the Q output 136 of the flip-flop 126, which is switched to a high condition by a positive voltage pulse from the process 110 on line 112 as previously described, is connected to the clock input 138 of a clocked D flip-flop 140 which has its DATA input 142 fixed at a high condition. Thus the Q output 144 of the flip-flop 140 is driven to a high condition which enables the free running clock output 106 to be gated through NAND gate 146 to the clock input 148 of a decade counter 150, such as Motorola Part No. MC-14017. The $Q_3$ output 152 of the decade counter 150 is gated through inverter 154 and NAND gate 156 to the reset 158 of the flip-flop 100 thus disabling NAND gate 58. The $Q_6$ output 160 from the decade counter 150 is similarly gated through inverter 162 and NAND gate 164 to produce a positive voltage pulse on the reset input 166 of the counter 56. Lastly, the $Q_9$ output 168 of the decade counter 150 serves two distinct functions. First the $Q_9$ output 168 is gated through NOR gate 170 and inverter 176 to produce a positive voltage pulse at the reset input 174 of the flip-flop 140 thus disabling NAND gate 146. Second, the $Q_9$ output 168 is gated through three inverters 176 as a time delay device, to produce a negative voltage pulse at one input 178 of the NAND gate 180. The corresponding positive voltage pulse at the output 182 of NAND gate 180 is used to reset the decade counter 150.

The circuit means 46 is now ready for the brake release test. The switch 76 is switched to the release position thus driving output line 80 of flip-flop 78 to a low condition and output 81 to a high condition. As in the brake application test, the test push button 70 is depressed thus setting flip-flop 72 and driving line 74 to a high condition. When the brake pedal 18 is released, a positive voltage pulse is again produced on line 40 which creates a negative voltage pulse at the output 82 of the NAND gate 84. Through inverters 86 and 184, a negative voltage pulse is produced at one input 186 of NOR gate 188. Since the second input 190 of NOR gate 188 is held at a low condition by a output 80 of flip-flop 78, a positive voltage pulse appears at the output 190 of the NOR gate 188 which in turn is connected to the clock input 192 of a clocked D flip-flop 194. The DATA turn 196 of the flip-flop 194 is hard wired at a high condition so that when a positive pulse appears at the clock input 192 of the flip-flop 194, the Q output 198 of the flip-flop 194 is driven to a high condition. The Q output 198 is connected to one input 200 of NAND gate 60 so that the clock 106 is gated through NAND gates 60 and 62 to the input 64 of the counter 66 in a manner similar to a brake application test. As thus far described, it should be apparent that like the brake application test, the count in the counter 66 represents the elapsed time in milliseconds from the release of the brake pedal 18.

When the voltage on line 44 from the pressure transducer 42 represents a value equal to 5 psi, signalling the end of the brake release test, the analog signal processor 110 again produces a positive voltage pulse on its output line 112. The voltage pulse on line 112 is inverted by inverter 202 to drive the input 204 of NAND gate 206 to a low condition thereby creating a positive voltage pulse at the output 208 of NAND gate 206. The output 208 of NAND gate 206 is connected to the reset input 210 of flip-flop 194 thus switching the Q output 198 of the flip-flop 194 to a low condition and disabling NAND gate 60. With NAND gate 60 disabled the clock output 106 is no longer gated through NAND gates 60 and 62 thus stopping the input clock pulses to the counter 66. The output 208 from NAND gate 206 also simultaneously resets the test flip-flop 72. It can thus be seen that the count in the counter 66 represents in milliseconds the elapsed time from the release of the brake pedal 18 and until a pressure of 5 psi is obtained in the brake chamber 20, thus corresponding to the Federal Regulations on the brake release test.

In order to selectively display the test results for the brake actuation or the brake release test, the display device 52 is provided. Since both the count in the counter 56 and in the latch 68 are binary in form, a decoder driver 212, such as a Motorola Part No. MC-14511, provides a decimal output for diplay unit 214. The display unit 214 is preferably a seven segment LED display although any convenient display means may be used within the scope of the invention.

A tri-state transmission gate 216, such as Motorola Part No. MC-14016, is utilized in conjunction with the latch 68 to provide a selectively display of the count in either the latch 68 or the counter 66. The transmission gate inputs 218 are connected to the outputs 220 of the counter 66. The outputs 222 of the transmission gate 216 are connected to the inputs 224 of the driver decoder 212 and also to the outputs 226 of the latch 68. A control line 228 which is connected to the output 80 of the apply-release flip-flop 78 is connected to the control input 230 and 232 of the latch 68 and transmission gate 216, respectively. With the switch 76 in the apply position, the control line 228 is in a high condition which enables the latch 68 and disables the transmission gate 216 so that the outputs 226 of the latch 68 are fed into the decoder drive 212 and subsequently displayed on the display means 214. Conversely, when the applied release switch 76 is in the release position, the control line 228 is in a low condition thus disabling the latch 68, and enabling the transmission gate 216 so that the count in the counter 66 is transmitted through the transmission gate 216 into the decoder drive 212 and accordingly displayed on the display means 214.

When a new test is desired, a reset pushbutton switch 230 is depressed thus resetting flip-flops 126, 194, 100, and 72. Similarly, the reset switch 230 resets the decade counter 150, the counter 66, and clears the latch on line 232 so that the circuit means 46 is prepared for a new brake application test.

An exemplary signal processor 110 is illustrated in FIG. 4 in simplified form and with parts removed for clarity. The processor 110 includes a voltage comparator 300 having a first input 302 coupled to the output line 44 from the pressure transducer 42. One of the two outputs 304 and 306 from a voltage divider 308 is gated through a transmission gate 310 to the second input 312 of the voltage comparator 300. The transmission gate 310 is similar to the transmission gate 216 as has been previously described and accordingly include a control input 314 which is connected to the output 80 of the APPLY/RELEASE flip-flop 78. Thus, with the APPLY/RELEASE switch 76 in the apply position, the line 80 is in a high condition so that the output 304 from the voltage divider 308 gated through the gate 310 and to the input 312 of a voltage comparator 300. Conversely, with the APPLY/RELEASE switch in the release position, the line 80 is in a low condition so that the output 306 from the voltage divider 308 is gated through the gate 310 to the input 312 of the voltage comparator 300.

The voltage comparator 300 is commercially available and functions such that its output 316 drops to a low condition whenever the voltage at input 302 exceeds the voltage at input 312. The voltage comparator output 316 in turn is connected to a base of a transistor 318 so that the transistor 318 conducts and drives its emitter output 320 to a low condition whenever the comparator output 316 is at a low condition. The emitter output 320 is coupled to one input of an EXCLUSIVE OR gate 324 through an inverter 322. The inverted output from the APPLY/RELEASE flip-flop 78 is coupled to the other input of the EXCLUSIVE OR gate 324.

In operation, during an APPLY test, the transmission gate 310 couples the voltage divider output 304, which corresponds to the voltage output from the pressure transducer at 60 psi, to the voltage comparator input 312. Thus, when the pressure in the brake chamber exceeds 60 psi, the voltage on line 44 from the transducer exceeds the voltage level at input 312 of the voltage comparator 300 and the voltage comparator output 316 is driven to a low condition. This produces a positive voltage pulse at the input of the EXCLUSIVE OR gate 324. The other input to the EXCLUSIVE OR gate 324 is at a low condition so that a positive pulse is produced by the gate 324 and fed to one input of a NAND gate 326. The other input of the NAND gate is coupled to the output line 74 of the test flip-flop 72 so that a positive pulse is produced on line 112 by an inverter 328 and sets the flip-flop 126 in the already described manner.

During a release test, the control input 314 is inverted so that the transmission gate 310 connects the voltage divider output 306 to the voltage comparator input 312. The output 306 roughly equals the voltage output produced by the transducer at 5 psi.

At the initiation of the release test, the output from the pressure transducer 42 exceeds the input 312 at the voltage comparator 300 so that the voltage comparator output 316 is initially low. This is inverted by inverter 322 to produce a high input to the EXCLUSIVE OR gate 324. The other input to the gate 324 is also in a high condition so that the output from the gate 324 is in a low condition which disables the gate 326. When the pressure in the brake chamber, however, drops below 5 psi, the voltage output 316 from the comparator 300 inverts and generates a positive pulse through the EXCLUSIVE OR gate 324, NAND gate 326, and the inverter 328 to the line 112.

In the above described manner, the signal processor 110 generates a positive pulse along line 112 when the pressure in the brake chamber exceeds 60 psi during a brake actuation test or falls below 5 psi during a brake release test. It will be understood, of course, that the voltage divider 308 may be present, or adjustable, for any desired pressure ratio or pressure transducer. The voltage divider 308 preferably comprises a resistance bridge and, as will be obvious to all those skilled in the art, the voltage divider 308 can be rapidly calibrated with the introduction of appropriate potentiometers within the circuitry. Additionally, it will be understood that other appropriate signal processors 110 may be utilized while remaining within the scope of the invention.

It can thus be seen that the brake tester of the present invention provides substantial advantages over the previously known brake testers. By utilizing an external source of pressure, the desired initial reservoir pressure of 100 psi for the brake application test and 95 psi for the brake release test may be easily and rapidly obtained. Furthermore, the circuit means 46 permits a brake application test and a brake release test to be sequentially performed without any intervening recordation of data or resetting of pressure controls, thereby saving costly test time. Most importantly, since the brake tester housing may be located in a cab of a vehicle, only a single test operator is required to perform both the brake application and release tests rather than two operators as required by previously known brake testers.

Having described my invention, many modifications thereto will become apparent to those skilled in the art to which the invention pertains without deviating from the spirit of the invention as defined by the scope of the appended claims.

What is claimed is:

1. A brake tester for a vehicle having a fluid brake system, said system having a reservoir which fluidly communicates with a vehicle brake chamber upon actuation of a vehicle brake pedal, said brake tester comprising,
   a housing,
   valve means contained within said housing for controlling the fluid pressure within said reservoir,
   a pressure transducer operatively coupled with said brake chamber and adapted to generate an analog electrical output signal representative of the fluid pressure within the brake chamber, and
   circuit means for measuring the elapsed time between the depression of the brake pedal and the attainment of a first pressure within said brake chamber and for measuring the elapsed time between the subsequent release of the brake pedal and the attainment of a second pressure within said brake chamber, said second pressure being lower than said first pressure, said circuit means comprising:
   accelerometer means attached to the brake pedal which emits an output signal in response to movement of the brake pedal,
   an analog signal processor having an input coupled to the analog output signal from said pressure transducer wherein said signal processor generates a first timing signal upon the depression of said brake pedal and the attainment of said first pressure in said brake chamber and wherein said signal processor generates a second timing signal upon the release of said brake pedal and the attainment of said second pressure in said brake chamber,
   first timing means started by the signal from said accelerometer means and stopped by said first timing signal, and
   second timing means started by the signal from said accelerometer means and stopped by said second timing signal.

2. The invention as defined in claim 1 wherein said valve means further comprises,
   a valve means contained in said housing,
   a first conduit connected at one end to said valve and at its other end to a source of external fluid pressure, and
   a second conduit connected at one end to said valve and at its other end to said reservoir, wherein said valve means is operable upon actuation to permit fluid communication from said first conduit to said second conduit.

3. The invention as defined in claim 2 and including a pressure gage secured in said housing and in fluid communication with said second conduit.

4. The invention as defined in claim 2 wherein said valve is an electric solenoid valve.

5. The invention as defined in claim 1 and including memory means for storing the results of said first timing means and said second timing means.

6. The invention as defined in claim 1 wherein said first timing means comprises a counter and a free running clock selectively gated into said counter upon the signal from the accelerometer means, and a latch having its inputs connected to the outputs of said counter and adapted to store the count from the counter upon the first timing signal from the analog signal processor, and wherein said second timing means comprises
   means to reset the counter after the first timing signal,
   means to stop the counter upon the second timing signal from the analog signal processor, and
   means to selectively display the results stored in the latch and the counter.

7. The invention as defined in claim 7 wherein said latch is tri-state latch and said last mentioned means further comprises a tri-state transmission gate having its inputs connected to the counter outputs and its outputs connected to both the display means and the latch outputs and control means to alternatively activate the transmission gate or the latch.

8. The invention as defined in claim 6 wherein said analog processor further comprises
   a voltage comparator having one input coupled to said pressure transducer,
   a voltage divider having at least a first and a second output means for connecting one of said voltage divider outputs to the other input of said voltage comparator, wherein said first voltage divider output corresponds to the output signal from said pressure transducer when the pressure in the brake chamber substantially equals said first pressure and wherein said second voltage divider output corresponds to the output signal from the pressure transducer when the fluid pressure in the brake chamber substantially equals said second pressure,
   circuit means for generating an output pulse of a preselected polarity when the voltage level from the pressure transducer output exceeds the connected first voltage divider output and when the voltage level from the pressure transducer output falls below the connected second voltage divider output.

9. The invention as defined in claim 1 wherein said housing is dimensioned to fit within the cab of said vehicle so that a single operator can control said valve means and circuit means within said housing and also control the actuation of said vehicle brake pedal.

* * * * *

UNITED STATES PATENT AND TRADEMARK OFFICE
CERTIFICATE OF CORRECTION

PATENT NO. : 4,062,224

DATED : December 13, 1977

INVENTOR(S) : Leo Z. Zeleney

It is certified that error appears in the above-identified patent and that said Letters Patent are hereby corrected as shown below:

Col. 1, line 20, after "of", insert --100--;

line 25, delete "moment", insert --movement of--.

Col. 2, line 7, delete "pressurized", insert --pressurize--;

line 60, delete "electric", insert --electronic--.

Col. 3, line 4, delete "pressure", insert --pressurize--.

Col. 6, line 6, delete "process", insert --processor--;

line 15, after "reset", insert --input--;

line 43, delete "a" (second occurrence), insert --an--;

line 47, delete "turn", insert --input--;

line 52, after "clock", insert --output--.

UNITED STATES PATENT AND TRADEMARK OFFICE
CERTIFICATE OF CORRECTION

PATENT NO. : 4,062,224

DATED : December 13, 1977

INVENTOR(S) : Leo Z. Zeleney

Page 2 of 2

It is certified that error appears in the above-identified patent and that said Letters Patent are hereby corrected as shown below:

Col. 7, line 22, delete "selectively", insert --selective--.

Col. 8, line 57, delete "present", insert --preset--.

Col. 10, line 30, delete "7", insert --6--;

line 31, after "is", insert --a--;

line 42, after "output", insert --and--.

Signed and Sealed this

Second Day of May 1978

[SEAL]

Attest:

RUTH C. MASON
Attesting Officer

LUTRELLE F. PARKER
Acting Commissioner of Patents and Trademarks